United States Patent [19]
Matsuo et al.

[11] Patent Number: 6,166,119
[45] Date of Patent: Dec. 26, 2000

[54] FLOWABILITY ADDITIVE

[75] Inventors: Shigemi Matsuo; Hidenori Nagamine; Akira Ota, all of Kanagawa-ken, Japan

[73] Assignee: MBT Holding AG, Zurich, Switzerland

[21] Appl. No.: 09/117,464

[22] PCT Filed: Nov. 28, 1997

[86] PCT No.: PCT/EP97/06945

§ 371 Date: Apr. 14, 1999

§ 102(e) Date: Apr. 14, 1999

[87] PCT Pub. No.: WO98/24734

PCT Pub. Date: Jun. 11, 1998

[30] Foreign Application Priority Data

Dec. 6, 1996 [JP] Japan ..................... 8-340448

[51] Int. Cl.$^7$ ............... C08K 5/06; C08L 1/20; C08L 1/28; C08L 5/00
[52] U.S. Cl. ............... 524/376; 524/42; 524/43; 524/44; 524/45; 524/46; 524/55; 524/56; 524/57; 524/58; 524/377; 106/823; 536/88; 536/91; 536/95; 536/96; 536/123
[58] Field of Search ................ 106/730, 823, 106/708, 98; 524/42, 43, 44, 45, 46, 55, 56, 57, 58, 377, 2, 3, 4, 5, 6, 7, 8, 9, 376; 536/88, 91, 95, 96, 123

[56] References Cited

U.S. PATENT DOCUMENTS

| | | | |
|---|---|---|---|
| 2,662,064 | 12/1953 | Mead | 524/7 |
| 4,021,257 | 5/1977 | Bernett | 524/6 |
| 4,058,405 | 11/1977 | Snyder et al. | 106/98 |
| 4,126,009 | 11/1978 | Tomic | 405/269 |
| 4,188,231 | 2/1980 | Valore | 106/823 |
| 4,363,666 | 12/1982 | Johnson et al. | 106/90 |
| 4,501,617 | 2/1985 | Desmarais | 106/730 |
| 4,846,889 | 7/1989 | Meyer | 524/5 |
| 4,939,192 | 7/1990 | t'Sas | 536/91 |
| 5,362,320 | 11/1994 | Whatcott | 106/708 |
| 5,663,218 | 9/1997 | Chappuis | 106/730 |
| 5,716,447 | 2/1998 | Matsuo | 106/823 |

FOREIGN PATENT DOCUMENTS

| | | | |
|---|---|---|---|
| 1349467 | 4/1974 | United Kingdom | C04B 13/28 |
| 2297086 | 7/1996 | United Kingdom | C04B 24/00 |

OTHER PUBLICATIONS

Petrolite Corporation V. Watson. Coms. Pats. (DC DC) 113 USPQ 248, Mar. 1957.
Austenal Laboratories V. Nobilium Processing Company of Chicago et al. (DC NILL) 115 USPQ 44, Jun. 1957.

Primary Examiner—Peter A. Szekely
Attorney, Agent, or Firm—Fish & Richardson P.C.

[57] ABSTRACT

A cement pumpability-enhancing additive which confers good pumpability on cementitious compositions such as concrete consists essentially of (a) polyethylene glycol;
(b) diethylene glycol monobutyl ether and/or a derivative thereof;
(c) polysaccharide; and
(d) a thickening polymer selected from the group consisting of polyacrylic acid derivatives, polyacrylic amide derivatives, cellulose ethers, polyphenyl ethers and polyalkylene glycol fatty acid esters;

the weight solids proportions of (a), (b), (c), and (d) in the additive being respectively 5–55%, 10–80%, 1–20% and 1–20%. The additive is preferably used with a cement dispersing agent.

1 Claim, No Drawings

FLOWABILITY ADDITIVE

The present invention relates to a a method of improving the pumpability of cementitious compositions and to a cement additive which is intended to improve the workability of cementitious compositions for pump application.

Pump application is a way of conveying cement compositions such as cement paste, mortar, and concrete to a desired place by means of a pump. In the building of modern large-scale concrete structures, efficient conveyance of large quantities of concrete is achieved by employing a high-capacity pump and a large-diameter pipe or branched pipes, the latter permitting concrete to be cast over a large area at one time. While this method is acceptable for conventional concrete, it is not acceptable for the high strength, high-flow concrete used in high-rise concrete buildings in urban areas, and which concrete exhibits special properties such as high strength and self-filling. If it is attempted to pump such concrete by the method hereinabove described, it will lose flowability during its conveyance, the degree of loss depending on mix proportions, environment and on-site conditions. The carrying out of the process and the quality of the final concrete are thereby compromised.

Several means have been proposed to address this problem, involving increasing the amount of powder or fine aggregate in a concrete mix, decreasing the amount of mixing water, or adding a thickening agent. These means, however, have the disadvantage of increasing the concrete viscosity, raising the pumping pressure, and reducing the durability of the cured concrete (because of the presence of a higher proportion of powder). Such disadvantages sometimes hinder site execution and quality control, and hence the abovementioned means are not a satisfactory solution at the present time.

The use of pumpability admixtures has been suggested, one such admixture containing as essential ingredients polyethylene glycol and polycarboxylic acid-based dispersing agent. Unfortunately, this dispersing agent increases the concrete viscosity or cannot prevent the decrease of flowability completely after pumping.

There is therefore a demand for cement additive which permits smooth pump application of concrete, while ensuring good flowability and pumpability, without causing increase in viscosity.

In British Patent 2,297,086 there is disclosed a pumping aid which is a combination of polyethylene glycol and diethylene glycol monobutyl ether (butyl "Carbitol" (trade mark) or a derivative thereof). An optional component in this pumping aid was a polysaccharide.

This pumping aid provided a considerable advance in the art, but it was found that in certain difficult circumstances its performance was not adequate. Such circumstances included the considerable change in fluidity just after a mixing, or the fluctuations caused by such factors as change in the mix proportions of the composition being pumped, fluctuations in aggregate quality, or an increase in pumping pressure in a desire to reduce time.

It has now been found that it is possible substantially to overcome these problems and provide good pumpability and flowability for such concretes while retaining their good properties. The invention therefore provides a cement pumpability-enhancing additive which consists essentially of (a) polyethylene glycol;
(b) diethylene glycol monobutyl ether and/or a derivative thereof;
(c) polysaccharide; and
(d) a thickening polymer selected from the group consisting of polyacrylic acid derivatives, polyacrylic amide derivatives, cellulose ethers, alkylphenyl ethers and polyalkylene glycol fatty acid esters;

the weight solids proportions of (a), (b), (c), and (d) in the additive being respectively 5–55%, 10–80%, 1–20% and 1–20%.

The invention additionally provides a method of improving the pumpability of a cementitious composition by the incorporation therein prior to pumping of an additive as hereinabove defined.

Diethylene glycol monobutylether (hereinafter "DGME") is a well-known material and is commercially available, for example, as butyl "Carbitol" (trade mark). The derivative used in the present invention is preferably an adduct of DGME with 1–2 mol of propylene oxide. It is preferred to have present at least some DGME, and the preferred material is a mixture of DGME and the abovementioned adduct.

The polyethylene glycol used in the present invention is preferably one which has an average molecular weight (weight-average) of from 4,000 to 150,000. It is preferably present in the proportion of from 5–50%.

The polysaccharide used in the present invention is preferably one or more selected from curdlan, sugar alcohol, xanthan gum, guar gum, welan gum and β-1,3-glucan.

The thickening polymers for use in this invention may be selected from a wide range of suitable materials. Preferred examples include polyacrylic acid derivatives, polyacrylamide derivatives, cellulose ethers, polyalkylene glycol fatty acid esters and alkylphenyl ethers. In the case of polyacrylic acid derivatives, polyacrylamide derivative and cellulose ethers, they should be such that the viscosity of 1 wt. % aqueous solution is from 1,000–1,000,000 cP (20° C.). In the case of polyalkylene glycol fatty acid esters and alkylphenyl ethers, the viscosity of 10 wt. % aqueous solution of these is preferably 10–500 cP (20° C.). It is possible and permissible to use more than one such thickening polymer.

The cement pumpability-enhancing additive according to the present invention should be used in an amount adequate to achieve good pumpability with retention of properties. This will vary depending on the cement composition to which it is added. Usually the amount ranges from 0.05 to 5.0, preferably from 0.05 to 2, wt % (in terms of solids in the cement additive) for the amount of cement contained in the cement composition. It is not specifically limited so long as there is enough to impart desired flowability and pumpability to the cement composition for pump application.

The cement additive according to the present invention should preferably be used in combination with a cement dispersing agent. This may be selected from any of the commercial-available cement dispersing agents, such as a polycarboxylic acid, aminosulfonic acid, a napthalene-sulfonic acid-formalin condensate, a melamine sulfonic acid-formalin condensate, ligninsulfonic acid, and a hydroxycarboxylic acid, and metal salts thereof (including alkali metal salts and alkaline earth metal salts). In this particular embodiment, the cement dispersing agent should be present in an amount up to 3% (by weight solids on cement). In this case, the total proportion of additive+ cement dispersing agent should not exceed 5% by weight solids based on cement.

The abovementioned DGME/DGME derivative, polyethylene glycol, polysaccharide, thickening polymer and dispersing agent should preferably be used blended as a single component; however, they may also be used as two or more components.

The cement pumpability-enhancing additive according to the present invention may be used in combination with other additives, such as air-entraining agents, drying shrinkage reducing agents, high-early strengthening agents, setting accelerators, setting retarders, defoaming agents, rust inhibitors and accelerating agents. Such additives perform their normal functions and are used in art-recognised quantities.

Cementitious compositions to which the additives of this invention have been added exhibit a combination of good pumpability and good viscosity. The compositions flow well and are easy to apply. In an especially valuable embodiment of the invention, the high-strength, high-flow concretes used nowadays for construction, which have not been easy to pump using conventional technology, can be made readily pumpable with little or no loss of properties by means of this invention. A particular feature of the invention is the ability of the compositions according to the invention to minimise changes in fluidity under the circumstances hereinabove described. The invention therefore also provides a method for applying a cementitious composition by pumping, wherein there is first added to the composition a pumpability-enhancing additive as hereinabove described, and the cementitious composition is then pumped. The invention further provides a pumpable cementitious composition comprising a cementitious composition and a pumpability-enancing additive as hereinabove described.

The present invention will now be further explained with reference to the following non-limiting examples which demonstrate the application of the cement additive to mortar and concrete.

EXAMPLES

Materials Used a) Fine aggregate:
   Oi river system land sand (specific gravity=2.59, fineness modulus=2.72: hereinafter described as "land sand".)
   Ako, Hyougo prefecture, crushed sand (specific gravity=2.56, fineness modulus=2.93: hereinafter described as "crushed sand".)
   Kisarazu, Chiba prefecture, pit sand (specific gravity=2.63, fineness modulus=2.41: hereinafter described as "pit sand".)

b) Coarse aggregate:
   Ome sandstone crushed stone (specific gravity=2.65, maximum particle diameter=20 mm)

c) Cement:
   Ordinary portland cement ("OPC") manufactured by Chichibu Onoda Cement Corporation, (specific gravity=3.16)
   Low heat portland cement ("LHC") manufactured by Nihon Cement Co., Ltd. (specific gravity=3.20)
   Usage of ordinary portland cement manufactured by Nihon Cement Co., Ltd. and fly-ash manufactured by Denpatsu Coaltech Co., Ltd. in a weight ratio of 4 to 1 ("FAC") (specific gravity=2.97)

d) Thickening polymer
   Polyacrylamide derivative ("Sumiflock" (trade mark) FA-200 manufactured by Sumitomo Chemical Co., Ltd. ("PAA")
   Cellulose ether (SFCA-2000 manufactured by Shin-Etsu Chemical Co., Ltd. ("CLE")
   Polyalkylene glycol fatty acid ester (Ionet (trade mark) DO-1000 manufactured by Sanyo Kasei Kogyo Co., Ltd. ("PAG")
   Alkylphenyl ether ("Nonipol" (trade mark) 100 manufactured by Sanyo Kasei Kogyo Co., Ltd. ("APE")

e) DGME derivative:
   Butyl "Carbitol" ("BCR"), tert-butyl "Carbitol" ("TBC"), adduct of butyl "Carbitol" with 1 mol of propylene glycol ("BP1"), adduct of butyl "Carbitol" with 2 mol of propylene glycol ("BP2")

f) Polyethylene glycol derivatives:
   Polyethylene glycol (average molecular weight 4000, hereinafter referred to as PG-04)
   Polyethylene glycol (average molecular weight 10000, hereinafter referred to as PG-10)
   Polyethylene glycol (average molecular weight 20000, hereinafter referred to as PG-20)
   Polyethylene glycol (average molecular weight 150000, hereinafter referred to as PG-150)

g) Polysaccharide
   Curdlan (hereinafter referred to as CA)
   Sugar alcohol "Sorbit" (trade mark) PO-30 manufactured by Towa Kasei Kogyo Co., Ltd., hereinafter referred to as PO)
   Xanthan gum (hereinafter referred to as XG)
   Guar gum (hereinafter referred to as GG)

h) Cement dispersing agent:
   Polycarboxylate "Rheobuild" (trade mark) SP-8N manufactured by NMB Ltd., hereinafter referred to as SP-8N)
   Formalin high condensates of naphthlenesulfonate "Rheobuild" SP-9N manufactured by NMB Ltd., hereinafter referred to as SP-9N)
   Formaldehyde high condensate of melamine sulfonate "Rheobuild" NL-4000 manufactured by NMB Ltd., hereinafter referred to as NL-40)
   Mixture of lignosulfonate and oxycarboxylate ("Pozzolith" (trade mark) No. 70 by NMB Ltd., hereinafter referred to as PZ-70)

1) Mortar and Concrete: Mix Proportion, Preparation and Materials

I-I) Mortar

An evaluation test is carried out using mortar of the mix proportion shown in Table 1. Each material is measured so that the volume of the mix is 30 liters, and all the materials are placed into a pan-type enforced mixer with a nominal capacity of 50 liters and mixed for 120 seconds to prepare the mortar. For the mix proportion shown in Table 1 are determined water-cement ratio, sand-cement ratio, unit water content, unit cement content and unit fine-aggregate content on the basis of the mix proportion of high flow concrete which exhibits 60±5 cm in the slump flow in which a unit cement volume is about 550 kg/m$^3$. Additionally, the air content of the mortar is in the range of 1.5±0.5 vol %.

1-2) Concrete

An evaluation test is carried out using concrete of the mix proportion No. 1 and 2 shown in Table 2. Each material is measured so that the volume of the mix is 4 m³ and all the materials are placed into an enforced twin-shaft mixer with a capacity of 4 m³ and mixed for 60 seconds to prepare concrete. Additionally, the slump, slump flow, and air content of the mix proportion No. 1 are 25.5 cm, 58.0–71.0 cm, and 1.0–2.0% respectively, and those of the mix proportion No. 2 are 18.5–19.5 cm, 28.0–34.0 cm, and 4.0–5.0% respectively.

TABLE 1

| Mix No. | Water/cement ratio (%) | Sand/cement ratio | Cement | Fine aggregate |
|---|---|---|---|---|
| 1 | 30.0 | 1.30 | OPC | land sand |
| 2 | | | OPC | crushed sand |
| 3 | | | OPC | pit sand |
| 4 | | | LHC | land sand |
| 5 | | | FAC | land sand |

TABLE 2

| Mix No. | Water/cement ratio (%) | Percent fine aggregate (%) | Unit contents (kg/m3) Water | Cement | Cement | Fine aggregate |
|---|---|---|---|---|---|---|
| 1-A | 30.0 | 44.8 | 170 | 567 | OPC | land sand |
| 1-B | | | | | OPC | pit sand |
| 1-C | | | | | LHC | pit sand |
| 2 | 55.0 | 49.0 | 170 | 309 | OPC | land sand | i) Sample:

In Table 3 are shown the types and the mixing ratio of thickening polymers, DGME derivatives, polyethylene glycols and polysaccharides of sample used in examples and comparative examples.

TABLE 3

| | Components and their mixing ration (wt. %) | | | | | | | |
|---|---|---|---|---|---|---|---|---|
| | DGME | | Polyethylene glycol | | Poly-saccharide | | Thickening polymer | |
| Type of sample | Type | Ratio | Type | Ratio | Type | Ratio | Type | Ratio |
| A | BCR | 40 | PG-20 | 40 | CA | 15 | CLE | 5 |
| B | TBC | 40 | PG-20 | 40 | CA | 15 | CLE | 5 |
| C | BC1 | 40 | PG-20 | 40 | CA | 15 | CLE | 5 |
| D | BC2 | 40 | PG-20 | 40 | CA | 15 | CLE | 5 |
| E | BCR | 25 | PG-04 | 55 | CA | 15 | CLE | 5 |
| F | BCR | 30 | PG-10 | 50 | CA | 15 | CLE | 5 |
| G | BCR | 75 | PG-150 | 5 | CA | 15 | CLE | 5 |
| H | BCR | 40 | PG-20 | 40 | CA | 5 | CLE | 5 |
| I | BCR | 40 | PG-20 | 40 | XG | 5 | CLE | 5 |
| J | BCR | 40 | PG-20 | 40 | GG | 5 | CLE | 5 |
| K | BCR | 45 | PG-20 | 45 | CA | 8 | PAA | 2 |
| L | BCR | 40 | PG-20 | 40 | CA | 10 | PAG | 10 |
| M | BCR | 35 | PG-20 | 35 | CA | 10 | AFE | 20 |
| O | — | — | PG-20 | 100 | — | — | — | — |
| P | — | — | PG-150 | 100 | — | — | — | — |
| Q | — | — | — | — | — | — | PAA | 100 |
| R | — | — | — | — | — | — | CLE | 100 |
| S | BCR | 49 | — | — | CA | 48 | CLE | 3 |
| T | BCR | 49 | PG-20 | 48 | — | — | CLE | 3 |
| U | BCR | 40 | PG-20 | 40 | CA | 20 | — | — |

2) Test Method of Mortar and Concrete 2-1) Static Pressure Test for Mortar

Using the mixed mortar samples shown in Table 1, there are measured the flow (Fp1) of mortar intermittently added with a constant pressure and the flow (F0) of the same mortar preserved at a standing condition for the same period of time. From this can be calculated the mortar flow ratio (Fp1/F0) to evaluate the effect that the static pressure condition exerts on the fluidity of mortar. These test results are shown in Table 4.

a) Application of pressure: The mortar sample is placed in a test container specified by "Pressure Bleeding Test Method" in "Guide for Pump Application of Concrete (draft)" prescribed by the Japan Society of Civil Engineers, and is pressurised so that the pressure reaches 50 kgf/cm² in 5 seconds. After maintaining this for 10 seconds, the pressure is relieved in 5 seconds. After repeating 30 cycles of this operation, the mortar flow is measured.

b) Mortar flow: The flow cone is used which is specified by "Method for Physical Test of Cement" in JIS R-5201. After pulling up the flow cone filled with mortar, a stopped mortar spread is measured.

2-2) Pumping Test of Mortar

Using the mixed mortar samples shown in Table 1, there are measured the flow (Fp2) of mortar after pumping at a constant discharge volume and at a constant pumping time in each case and the flow (F0) of the mortar preserved at a standing condition for the same period of time as the pumping time, thereby being calculated mortar flow ratio (Fp2/F0) to evaluate the effect that the pumping condition exerts on the fluidity of mortar.

a) Pumping condition:

1) Pump: Mortar pump DM15 manufactured by Shin-Meiwa Kogyo Co., Ltd.

2) Pipe length: Flexible hose (2.5 cm×5 m)

3) Discharge volune: 6.0 liters/min.

4) Pumping time: 10 min.

5) Environmental temperature: 20° C.

b) Mortar flow: Measured as in 2-1 above 2-3) Pumping-test Method of Concrete

Using concrete adjusted to the mix proportion shown in Table 2, there are measured the slump flow of concrete after pumping at a constant discharge volume and at a constant pumping time using a concrete pump, and the slump flow of concrete preserved at a standing condition for the same period of time as the pumping time, thereby being evaluated the effect that the pumping exerts on the fluidity of concrete.

q) Slump flow: According to "Method for Test of Concrete Slump Flow (draft)" prescribed by the Japan Society of Civil Engineers.

b) Air-entrainment property: According to JIS A 1128 c) Pumping condition:

1) Pumper: Model PY 110-25
2) Pipe length: Horizontal length 50 m (5 inch steel pipe)
3) Discharge volume: 30 m³/hr.
4) Environmental temperature: 20° C.
3) Test results:

3-1) Mortar

In Table 4 are shown the results of the static pressure test and the pumping test. From Table 4 are ascertained the following effects in case of using the additive for cement composition in the invention for mortar.

TABLE 4

| | Additive for cement composition | | Cement dispersing Agent | | | | Mortar flow (mm) | | | Static pressure test | Pumping test |
|---|---|---|---|---|---|---|---|---|---|---|---|
| | Type | Amount Used as solids cX%) | Type | Amount Used (as product content) (CX%) | Cement | Fine aggregate | Standing condition F0 | After pressing FP1 | After pumping FP2 | Flow ratio FP1/F0 | Flow ratio FP2/F0 |
| Ex.1 | A | 0.20 | SP-8N | 1.0 | OPC | land sand | 241 | 244 | 239 | 1.01 | 0.99 |
| Ex.2 | B | 0.20 | SP-8N | 1.0 | OPC | land sand | 242 | 242 | 237 | 1.00 | 0.98 |
| Ex.3 | C | 0.20 | SP-8N | 1.0 | OPC | land sand | 240 | 238 | 233 | 0.99 | 0.97 |
| Ex.4 | D | 0.20 | SP-8N | 1.0 | OPC | land sand | 240 | 240 | 233 | 1.00 | 0.97 |
| Ex.5 | E | 0.35 | SP-8N | 1.0 | OPC | land sand | 248 | 243 | 233 | 0.98 | 0.94 |
| Ex.6 | F | 0.25 | SP-8N | 1.0 | OPC | land sand | 243 | 241 | 233 | 0.99 | 0.96 |
| Ex.7 | G | 0.10 | SP-8N | 1.0 | OPC | land sand | 239 | 232 | 220 | 0.97 | 0.92 |
| Ex.8 | H | 0.20 | SP-8N | 1.0 | OPC | land sand | 237 | 235 | 232 | 0.99 | 0.98 |
| Ex.9 | I | 0.20 | SP-8N | 1.0 | OPC | land sand | 239 | 237 | 237 | 0.99 | 0.99 |
| Ex.10 | J | 0.20 | SP-8N | 1.0 | OPC | land sand | 239 | 237 | 237 | 0.08 | 0.99 |
| Ex.11 | K | 0.20 | SP-8N | 1.0 | OPC | land sand | 240 | 240 | 235 | 1.00 | 0.98 |
| Ex.12 | L | 0.20 | SP-8N | 1.0 | OPC | land sand | 241 | 243 | 241 | 1.01 | 1.00 |
| Ex.13 | M | 0.20 | SP-8N | 1.0 | OPC | land sand | 237 | 230 | 223 | 0.97 | 0.94 |
| Ex.14 | A | 0.20 | SP-9N | 1.7 | OPC | land sand | 241 | 239 | 222 | 0.99 | 0.92 |
| Ex.15 | A | 0.20 | NL-40 PZ-70 | 2.0 250 | OPC | land sand | 235 | 230 | 214 | 0.98 | 0.91 |
| Ex.16 | L | 0.20 | SP-9N | 1.7 | OPC | land sand | 239 | 237 | 222 | 0.99 | 0.93 |
| Ex.17 | L | 0.20 | NL-40 PZ-70 | 2.0 250 | OPC | land sand | 233 | 226 | 210 | 0.97 | 0.90 |
| Ex.18 | A | 0.20 | SP-8N | 0.9 | LHC | land sand | 250 | 252 | 249 | 1.01 | 1.00 |
| Ex.19 | A | 0.20 | SP-8N | 0.9 | OPC + FA | land sand | 245 | 246 | 242 | 1.00 | 0.99 |
| Ex.20 | A | 0.20 | SP-8N | 1.0 | OPC | crushed sand | 249 | 247 | 244 | 0.99 | 0.98 |
| Ex.21 | A | 0.20 | SP-8N | 1.0 | OPC | pit sand | 239 | 237 | 229 | 0.99 | 0.96 |

| | Additive for cement composition | | Cement dispersing Agent | | | | Mortar flow (mm) | | | Static pressure test | Pumping test | |
|---|---|---|---|---|---|---|---|---|---|---|---|---|
| | Type | Amount Used as solids (Cx%) | Type | Amount Used (as product content) (Cx%) | Cement | Fine aggregate | Standing condition F0 | After pressing FP1 | After pumping FP2 | Flow ratio FP1/F0 | Flow ratio FP2/F0 | pumping pressure 1) |
| Comparative ex.1 | O | 0.10 | SP-8N | 1.0 | OPC | land sand | 241 | 227 | 200 | 0.94 | 0.83 | 1.08 |
| Comparative ex.2 | P | 0.10 | SP-8N | 1.0 | OPC | land sand | 237 | 223 | 199 | 0.94 | 0.84 | 1.06 |
| Comparative ex.3 | Q | 0.005 | SP-8N | 1.0 | OPC | land sand | 241 | 227 | 202 | 0.94 | 0.84 | 1.16 |
| Comparative ex.4 | R | 0.01 | SP-8N | 1.0 | OPC | land sand | 242 | 225 | 198 | 0.93 | 0.82 | 1.27 |
| Comparative ex.5 | S | 0.20 | SP-8N | 1.0 | OPC | land sand | 239 | 217 | 208 | 0.91 | 0.87 | 1.05 |
| Comparative ex.6 | T | 0.15 | SP-8N | 1.0 | OPC | land sand | 237 | 228 | 220 | 0.96 | 0.93 | 0.99 |
| Comparative ex.7 | U | 0.20 | SP-8N | 1.0 | OPC | land sand | 241 | 239 | 234 | 0.99 | 0.97 | 0.88 |
| Comparative | V | 0.20 | SP-8N | 1.0 | OPC | land sand | 238 | 214 | 202 | 0.90 | 0.85 | 1.03 |

TABLE 4-continued

| | | | | | | | | | | | | |
|---|---|---|---|---|---|---|---|---|---|---|---|---|
| ex.8 Comparative ex.9 | — | 0.20 | SP-8N | 1.0 | OPC | land sand | 234 | 217 | 189 | 0.93 | 0.81 | 1.03 |
| Comparative ex.10 | — | 0.20 | SP-9N | 1.7 | OPC | land sand | 239 | 221 | 191 | 0.93 | 0.80 | 1.25 |
| Comparative ex.11 | — | 0.20 0.20 | NL-40 PZ-70 | 2.0 250.0 [2] | OPC | land sand | 229 | 206 | 164 | 0.90 | 0.72 | 1.38 |
| Comparative ex.12 | U | | SP-8N | 0.9 | LHC | land sand | 268 | 263 | 248 | 0.98 | 0.93 | 0.89 |
| Comparative ex.13 | U | 0.20 | SP-8N | 0.8 | LHC | land sand | 245 | 233 | 218 | 0.95 | 0.89 | 0.95 |
| Comparative ex.14 | U | 0.20 | SP-9N | 1.0 | OPC + FA | land sand | 260 | 247 | 237 | 0.95 | 0.91 | 0.94 |
| Comparative ex.15 | U | 0.20 | SP-8N | 1.0 | OPC | crushed sand | 259 | 251 | 243 | 0.97 | 0.94 | 0.95 |
| Comparative ex.16 | U | | SP-8N | 1.0 | OPC | land sand | 232 | 218 | 211 | 0.94 | 0.91 | 0.99 |
| Comparative ex.17 | U | 0.20 | SP-9N | 1.1 | OPC | land sand | 248 | 238 | 231 | 0.96 | 0.93 | 0.99 |

[1] Pumping pressure: kgf/cm2
[2] ml/C = 100 kg

The examples 1–13 are according to the invention.

For comparison, it is shown that the comparative examples 1 and 2 are those to which polyethylene glycol and cement dispersing agent are added, the comparative examples 3 and 4 are those to which thickening polymer and cement dispersing agent are added, the comparative example 5 are those to which DGME derivative, polysaccharide, thickening polymer and cement dispersing agent are added, the comparative example 6 are those to which DGME derivative, polyethylene glycol, thickening polymer and cement dispersing agent are added, the comparative example 7 are those to which DGME derivative, polyethylene glycol, polysaccharide and cement dispersing agent are added, the comparative example 8 are those to which polyethylene glycol, polysaccharide, thickening polymer and cement dispersing agent are added, and the comparative examples 9–11 are those to which cement dispersing agent only are added.

The flow ratios of mortar in the static pressure condition and the pumping condition in the examples 1–13 are larger than those in the comparative examples 1–11 so that the decrease of fluidity is small and the pumping pressure is also small. Consequently, the pumpability of mortar using the additive in the invention shows a good performance in all cases.

The examples 14–17 show the cases in which the samples A or L of the invention and cement dispersing agents are used, and in which the type of the cement dispersing agent is varied. For comparison, it is shown that the comparative examples 9–11 are those to which cement dispersing agents only are added. The flow ratios of mortar on the static pressure condition and pumping condition in the examples 14–17 are larger than those in the comparative examples 9–11, therefore, it can be understood that the decrease of fluidity is small and the pumping pressure is also small. Consequently, it is ascertained that the pumpability of mortar using the additive of the invention shows a good performance even if the type of cement dispersing agent is changed.

The examples 1, 18 and 19 show the cases in which the sample A in the invention and a cement dispersing agent are used, and in which the type of cement is varied. For comparison, it is shown that the comparative examples 7, 12, 13 and 14 are the cases in which the sample U and the cement dispersing agent are used, and in which the type of cement is varied. The fluidity change and pumping pressure of mortar on the static pressure condition and pumping condition in the examples 1, 18 and 19 are smaller than those in the comparative examples, and the pumpability of mortar employing the additive in the invention is good even if the type of cement is changed. On the contrary, the comparative example 7, in which the fluidity change before and after pumping and the pumping pressure are also small, shows good pumpability. However, the comparative examples 12 and 14 show the tendency that the fluidity change just after a mixing and before and after pumping and the pumping pressure increase. Further, as shown in the comparative example 13, in the case when the added amount of the cement dispersing agent is decreased and the fluidity just after the mixing is made identical with that of the examples, it is shown in that the fluidity change before and after pumping and the increase of pumping pressure tend to be accelerated.

The examples 1, 20 and 21 show the cases in which the sample A in the invention and a cement dispersing agent are used, and in which the type of fine aggregates is varied. For comparison, it is shown that the comparative examples 7, 15, 16 and 17 are the cases in which the sample U and the cement dispersing agent are used, and in which the type of fine aggregates is varied. The fluidity change and pumping pressure of mortar on the static pressure condition and pumping condition in examples 1, 20 and 21 are smaller than those in the comparative examples, and the pumpability of mortar using the additive of the invention is good even if the type of fine aggregates is changed. On the contrary, the comparative example 7, in which the fluidity change before and after pumping and the pumping pressure are also small, shows good pumpability, however, the tendency is shown that in the comparative example 15 the fluidity change just after mixing and before and after pumping and the pumping pressure increase, and that in the comparative example 16, the fluidity just after mixing decreases and the fluidity change before and after pumping and the pumping pressure increase. Further, as shown in the comparative example 17, in the case where the added amount of the cement dispersing agent is increased and the fluidity just after the mixing is made identical with that of the examples, it is shown that the fluidity change before and the increase after pumping and the increase of the pumping pressure tend to be inhibited, however, its pumpability of mortar is inferior to that of mortar in which the additive of the invention is used.

3-2) Concrete Test

In Table 5 are shown the results of the pumping test. From Table 5 are ascertained the following effects in the case of using the additive for cement composition in the invention for concrete.

The examples 22, 23, 27 and 28 show the cases in which the additives for cement composition of the invention are used. For comparison, it is shown that the comparative examples 21 and 22 are those adding cement dispersing agents only. The decreased amount of the slump flow before and after pumping, or of the slump in the examples 22, 23, 27 and 28 is 1.0–1.5 cm and is smaller compared to that in the comparative examples 21 and 22, showing that the pumpability of concrete using the additive in the invention is good.

The examples 22, 24 and 25 show the cases in which the sample A of the invention and a cement dispersing agent are used, while the types of cement or fine aggregate are varied. For comparison, it is shown that the comparative examples 18, 19 and 20 are the cases in which the sample U and the cement dispersing agent are used, while the types of cement or fine aggregate are varied. The decreased amount of the slump flow before and after pumping in the examples 22, 24 and 25 is as small as 0.5–1.5 cm and the pumpability of concrete using the additive in the invention is good even if the types of cement or fine aggregate are changed. On the contrary, the comparative example 18, in which the decreased amount of the slump flow before and after pumping is as small as 1.5 cm, shows good pumpability, however, in the comparative examples 19 and 20 the decreased amount of the slump flow just before and after pumping is as large as 6.0 cm and 4.0 cm respectively, and the change of the slump flow at the standing condition is also large compared to that of the examples.

TABLE 5

| | Mix No. | Additive for cement composition | | Cement | | | | Time course | |
| | | Type | Amount Used (as solids) (Cx%) | Type | Amount Used (as product content) (Cx%) | Cement | Fine aggregate | Measurement item | Standing condition | After pumping |
|---|---|---|---|---|---|---|---|---|---|---|
| Example 22 | 1 | A | 0.20 | SP-8N | 1.8 | OPC | land sand | Slump flow(cm) | 61.0 | 60.0 |
| | | | | | | | | Air content (%) | 1.6 | 1.6 |
| Example 23 | 1 | K | 0.20 | SP-8N | 1.80 | OPC | land sand | Slump flow(cm) | 61.5 | 60.5 |
| | | | | | | | | Air content (%) | 1.5 | 1.3 |
| Example 24 | 1 | A | 0.20 | SP-8N | 1.80 | OPC | pit sand | Slump flow(cm) | 63.0 | 61.5 |
| | | | | | | | | Air content (%) | 1.3 | 1.3 |
| Example 25 | 1 | A | 0.20 | SP-8N | 1.30 | LHC | pit sand | Slump flow(cm) | 64.0 | 63.5 |
| | | | | | | | | Air content (%) | 1.0 | 1.2 |
| Example 26 | 2 | A | 0.20 | PZ-70 | 250 ml/C = 100 kg | OPC | land sand | Slump flow(cm) | 19.5 | 18.0 |
| | | | | | | | | Air content (%) | 4.1 | 3.9 |
| Example 27 | 2 | L | 0.10 | PZ-70 | 250 ml/C = 100 kg | OPC | land sand | Slump flow(cm) | 18.5 | 17.5 |
| | | | | | | | | Air content (%) | 4.5 | 4.2 |
| Example 28 | 2 | M | 0.10 | PZ-70 | 250 ml/C = 100 kg | OPC | land sand | Slump flow(cm) | 19.0 | 17.5 |
| | | | | | | | | Air content (%) | 4.7 | 4.1 |
| Comparative ex. 18 | 1 | U | 0.20 | SP-8N | 1.80 | OPC | land sand | Slump flow(cm) | 63.0 | 61.5 |
| | | | | | | | | Air content (%) | 1.6 | 1.6 |
| Comparative ex. 19 | 1 | U | 0.20 | SP-8N | 1.80 | OPC | pit sand | Slump flow(cm) | 58.0 | 52.0 |
| | | | | | | | | Air content (%) | 1.6 | 1.6 |
| Comparative ex. 20 | 1 | U | 0.20 | SP-8N | 1.30 | LHC | pit sand | Slump flow(cm) | 71.0 | 67.0 |
| | | | | | | | | Air content (%) | 1.0 | 1.1 |
| Comparative ex. 21 | 1 | — | — | SP-8N | 1.80 | OPC | land sand | Slump flow(cm) | 60.0 | 51.0 |
| | | | | | | | | Air content (%) | 1.4 | 1.4 |
| Comparative ex. 22 | 2 | — | — | PZ-70 | 250 ml/C = 100 kg | OPC | land sand | | 18.5 | 10.0 |
| | | | | | | | | | 4.4 | 3.9 |

Consequently, use of the pumping additive according to the invention alleviates or removes entirely conventional problems, such as a considerable change of the fluidity just after mixing or before and after pumping, and an increase of pressure at a time of pumping, due to a difference in a mix proportion of cement composition or in a material used, and due to a fluctuation of aggregate's grain or surface water. Thus, it becomes possible to prepare high-quality concrete that is extremely good in pumpability and flowability.

What is claimed is:

1. A cement pumpability-enhancing additive which consists essentially of:

(a) polyethylene glycol;
   (b) diethylene glycol monobutyl ether;
   (c) polysaccharide; and
   (d) a thickening polymer selected from the group consisting of polyalkylene glycol fatty acid esters and alkylphenyl ethers which exhibit a viscosity from 10–500 cP (20° C. when in a 10% wt, aqueous solution);

the weight solids proportions of (a), (b), (c), and (d) in the additive being respectively 5–55%, 10–80%, 1–20% and 1–20%.

* * * * *